(12) United States Patent
Lombarte et al.

(10) Patent No.: US 7,988,084 B2
(45) Date of Patent: Aug. 2, 2011

(54) DEVICE FOR PRETENSIONING A SEATBELT

(75) Inventors: Jorge Lombarte, Hamburg (DE); Jon Burrow, Ortonville, MI (US)

(73) Assignee: Autoliv ASP, Inc., Ogden, UT (US)

( * ) Notice: Subject to any disclaimer, the term of this patent is extended or adjusted under 35 U.S.C. 154(b) by 412 days.

(21) Appl. No.: 12/195,591

(22) Filed: Aug. 21, 2008

(65) Prior Publication Data

US 2010/0044489 A1 Feb. 25, 2010

(51) Int. Cl.
  *B60R 22/28* (2006.01)
  *B60R 22/46* (2006.01)
(52) U.S. Cl. .................. 242/374; 242/379; 242/379.1
(58) Field of Classification Search ............. 242/374, 242/379, 379.1, 383, 383.2, 383.5, 384, 384.4–384.6; 280/805, 806, 807; 297/471, 472, 475–478, 297/480; 60/471, 472, 475–478, 480
See application file for complete search history.

(56) References Cited

U.S. PATENT DOCUMENTS

| | | | |
|---|---|---|---|
| 5,526,996 A | 6/1996 | Ebner et al. | |
| 5,697,571 A * | 12/1997 | Dybro et al. | 242/374 |
| 5,881,962 A | 3/1999 | Schmidt et al. | |
| 5,924,640 A * | 7/1999 | Hickey | 242/374 |
| 5,924,641 A | 7/1999 | Keller et al. | |
| 6,012,667 A | 1/2000 | Clancy, III et al. | |
| 6,105,894 A | 8/2000 | Singer et al. | |
| 6,345,504 B1 | 2/2002 | Takehara et al. | |
| 6,354,529 B1 * | 3/2002 | Asagiri et al. | 242/379 |
| 6,363,722 B1 | 4/2002 | Takehara | |
| 6,419,176 B1 * | 7/2002 | Mizuno | 242/374 |
| 6,523,769 B2 | 2/2003 | Hamaue et al. | |
| 6,532,739 B2 | 3/2003 | Kameyoshi et al. | |
| 6,592,064 B2 | 7/2003 | Clute et al. | |
| 6,616,081 B1 | 9/2003 | Clute et al. | |
| 6,669,131 B2 | 12/2003 | Takehara et al. | |
| 6,722,600 B2 | 4/2004 | Hamaue et al. | |
| 2002/0017582 A1 * | 2/2002 | Hamaue et al. | 242/374 |
| 2003/0213864 A9 | 11/2003 | Hamaue | |
| 2005/0178870 A1 | 8/2005 | Loffler et al. | |
| 2006/0118347 A1 | 6/2006 | Zelmer | |
| 2006/0124794 A1 | 6/2006 | Clute et al. | |
| 2006/0243843 A1 | 11/2006 | Clute | |

FOREIGN PATENT DOCUMENTS

DE 102006031360 A1 * 10/2007

* cited by examiner

*Primary Examiner* — Michael Mansen
*Assistant Examiner* — Scott Haugland
(74) *Attorney, Agent, or Firm* — Sally J. Brown; Brinks Hofer Gilson & Lione (57) ABSTRACT

In at least one embodiment of the present invention, a device for pretensioning a seatbelt is provided. The device comprises a spindle for receiving a portion of the seatbelt. A retractor frame that has a weakened portion is supported by the spindle for rotational movement within the retractor frame. A pretensioner is operatively connected to the spindle for rotating the spindle to tighten the seatbelt. The pretensioner includes pretensioner balls. The pretensioner is configured to drive the pretensioner balls toward a ball collection area adjacent to the weakened portion. The weakened portion is deformed by the pretensioner balls to increase the size of the ball collection area.

22 Claims, 5 Drawing Sheets

DEVICE FOR PRETENSIONING A SEATBELT

FIELD OF THE INVENTION

The present invention relates generally to seatbelt restraint devices for restraining an occupant of a vehicle, and more particularly relates to devices for pretensioning the seatbelt prior to or during a vehicle collision.

BACKGROUND OF THE INVENTION

Seatbelt restraint systems for vehicles often include a pretensioner which is structured to apply tension to the seatbelt when an impending impact event such as an accident situation is detected. When the pretensioner is activated, the pretensioner eliminates any slack in the seatbelt, and thus controls the physical space between the occupant and the seatbelt. In this manner, the occupant of the seat is coupled with the seatbelt as the occupant initially moves forward relative to the seat, thereby controllably restraining the occupant, reducing occupant excursion, and preventing undue loads when the occupant moves forwardly into the seatbelt.

BRIEF SUMMARY OF THE INVENTION

In at least one embodiment of the present invention, a device for pretensioning a seatbelt is provided that preferably improves package efficiency and management of the pretensioning energy. The device comprises a spindle for receiving a portion of the seatbelt. A retractor frame is supported by the spindle for rotational movement within the retractor frame. The retractor frame has a weakened portion. Operatively connected to the spindle for rotating the spindle to tighten the seatbelt is a pretensioner which includes pretensioner balls. The pretensioner is configured to drive the pretensioner balls toward a ball collection area that is adjacent to the weakened portion. The weakened portion is deformed by the pretensioner balls, increasing the size of the ball collection area.

In one aspect of the present invention, the pretensioner further includes a pinion adjacent to the retractor frame. The pinion is selectively engaged with the spindle for rotating the spindle to tighten the seatbelt. Disposed about the pinion is a tube. The tube has an open end in communication with the pinion. The pretensioner balls are contained in the tube. In fluid communication with the tube is a gas generator. The gas generator is configured to generate gas to pressurize the tube so as to advance the pretensioner balls through the open end, actuating the pinion to rotate the spindle and driving the pretensioner balls toward the ball collection area. Contacting the weakened portion are the pretensioner balls which deform the weakened portion, increasing the size of the ball collection area and reducing kinetic energy of the pretensioner balls.

Further objects, features, and advantages of the invention will become apparent from consideration of the following description and the appended claims when taken in connection with the accompanied drawings.

DETAILED DESCRIPTION OF THE INVENTION

Detailed embodiments of the present invention are disclosed herein. It is understood however, that the disclosed embodiments are merely exemplary of the invention and may be embodied in various and alternative forms. The figures are not necessarily to scale; some figures may be configured to show the details of a particular component. Therefore, specific structural and functional details disclosed herein are not to be interpreted as limiting but merely as a representative basis with the claims and for teaching one skilled in the art to practice the present invention.

Examples of the present invention seek to provide a device for pretensioning a seatbelt which preferably has better packaging efficiency and improved management of pretensioning energy.

Employing the principles of the present invention is the device for pretensioning a seatbelt. The device includes a spindle that is rotatably supported in a retractor frame. The spindle, which receives a portion of the seatbelt, is actuated to rotate via a pretensioner, thereby tightening the seatbelt. Specifically, the pretensioner imparts kinetic energy to pretensioner balls to actuate the spindle, driving the pretensioner balls toward a ball collection area. The ball collection area, which is adjacent to a weakened portion on the retractor frame, receives the pretensioner balls. The ball collection area expands via the weakened portion deforming from contact with the pretensioner balls. The deforming weakened portion absorbs at least some of the kinetic energy from the pretensioner balls. Accordingly, the device may be more space efficient because the collection area "as packaged" is preferably minimized and only expands when functioning to collect the pretensioner balls. Moreover, management of the pretensioning energy may be improved because the deforming weakened portion reduces the kinetic energy of the pretensioner balls. In one embodiment, reducing the kinetic energy of the pretensioner balls reduces the pressure on a surrounding pretensioner cover, which preferably reduces the possibly of the cover becoming disengaging from the device during pretensioning.

Referring to FIGS. 1-5, a device for pretensioning a seatbelt is provided. The device 10 is adapted for a vehicle having a seatbelt 12 restraining an occupant (not shown). As is known in the art, the vehicle includes a sensor sending a signal indicative of an emergency event such as an impact event, crash, emergency braking or the alike. The vehicle sensor may be a specific impact sensor, or may be a traditional vehicle sensor (e.g. a longitudinal or lateral acceleration sensor) or otherwise part of a control system having multiple sensors. Any other impact sensor that is or will be known to those skilled in the art may also be readily employed in conjunction with the device 10 of the present invention. An electronic control unit such as a central processing unit (CPU) or other controller receives a signal and controls the device 10 to respond by tightening the seatbelt 12 of the vehicle, e.g. via activation of a pretensioner.

The device 10 includes a spindle 14 for receiving a portion of the seatbelt 12. As is known in the art, during normal use the seatbelt 12 is wound up about the spindle 14. A retractor frame 16 locates and supports the spindle 14 with bearing surfaces so that the spindle 14 may rotate within the retractor frame 16. In one example, the spindle 14 rotates about an axis in a first direction for retraction and/or tightening of the seatbelt 12 and alternatively, rotates in a second direction (e.g. opposed direction) for protraction of the seatbelt 12.

The retractor frame 16 may be made of any suitable structural material, but preferably is made from a material that is plastically deformable (e.g. having a yield point beyond its elastic region on a stress-strain curve) so as to retain a deformed shape. Many metals, such as for example, low carbon steel may be used. Alternatively, many plastic materials may also be suitable for the retractor frame 16.

With reference to FIGS. 1, 2 and 8-9c, the retractor frame 16 has a weakened portion 18. The weakened portion 18 may be formed, for example, by localized thinning of a wall 20 that forms a portion of the retractor frame 16. Alternatively, the weakened portion 18 may be formed by the wall 20 having at least one aperture 22 formed therethrough. The aperture 22 may be a hole, a slot, or an elongated opening. In one example, the weakened portion 18 is a plurality of juxtaposed elongated openings 24 formed through the wall 20 so as to form an arrangement of expandable ribs. In one example illustrated in FIG. 8 the juxtaposed elongated openings 24 are formed as arcuate slots, but may have any shape suitable for weakening the wall 20. Alternatively, the weakened portion 18 may be an attached deformable member (not shown), such as for example, a plastically deformable plate that is attached to the retractor frame 16. In this example, the remaining portion of the retractor frame 16 may be made of a different material than the plastically deforming plate. Preferably, the plastically deformable plate is made from a high yielding material, whereas the yielding properties of the remaining portion of the retractor frame 16 are less of a concern.

Figure 1:
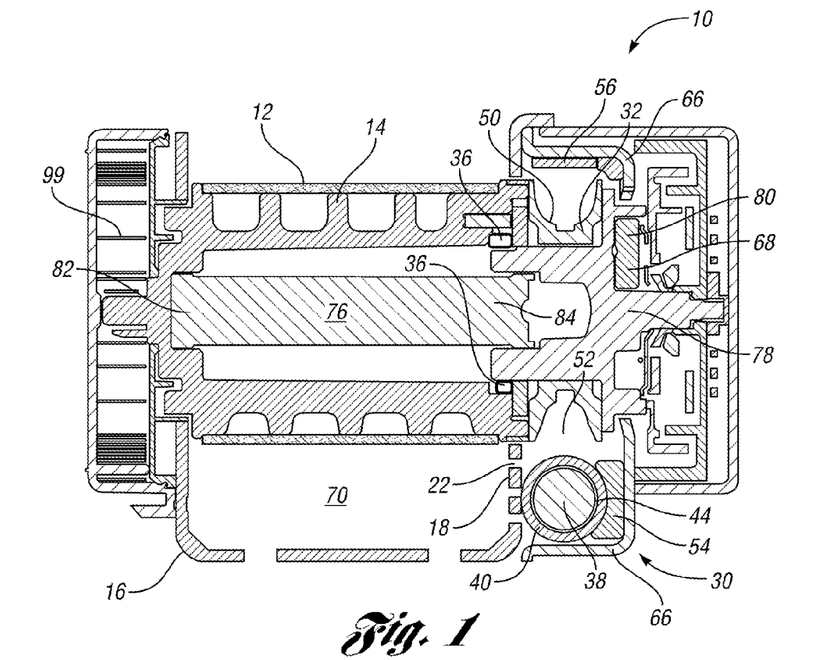
FIG. 1 is a cross-sectional view of a device for pretensioning a seatbelt in accordance with an embodiment of the present invention.
Figure 2:
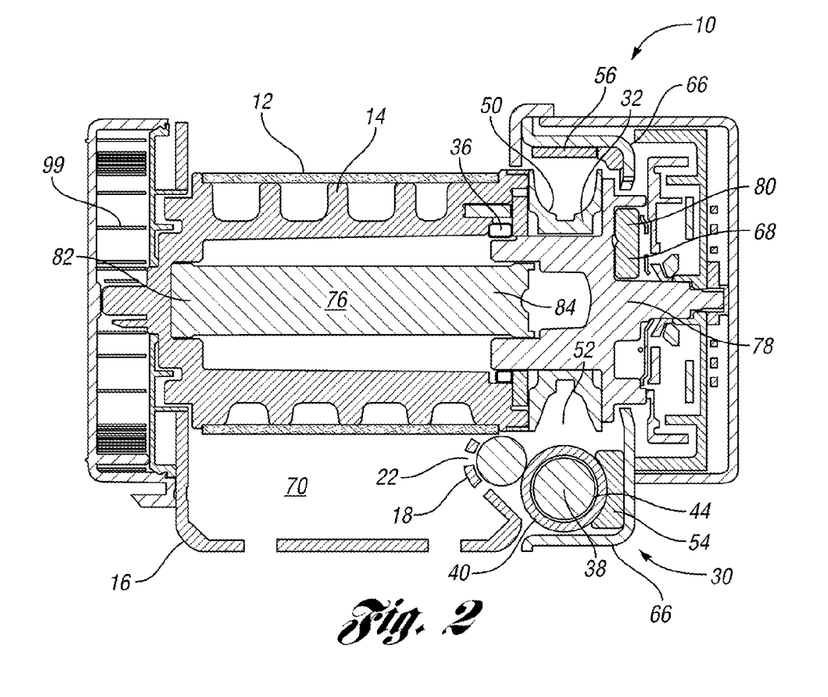
FIG. 2 is a cross-sectional view of a device for pretensioning a seatbelt in accordance with another embodiment of the present invention.
Figure 5:
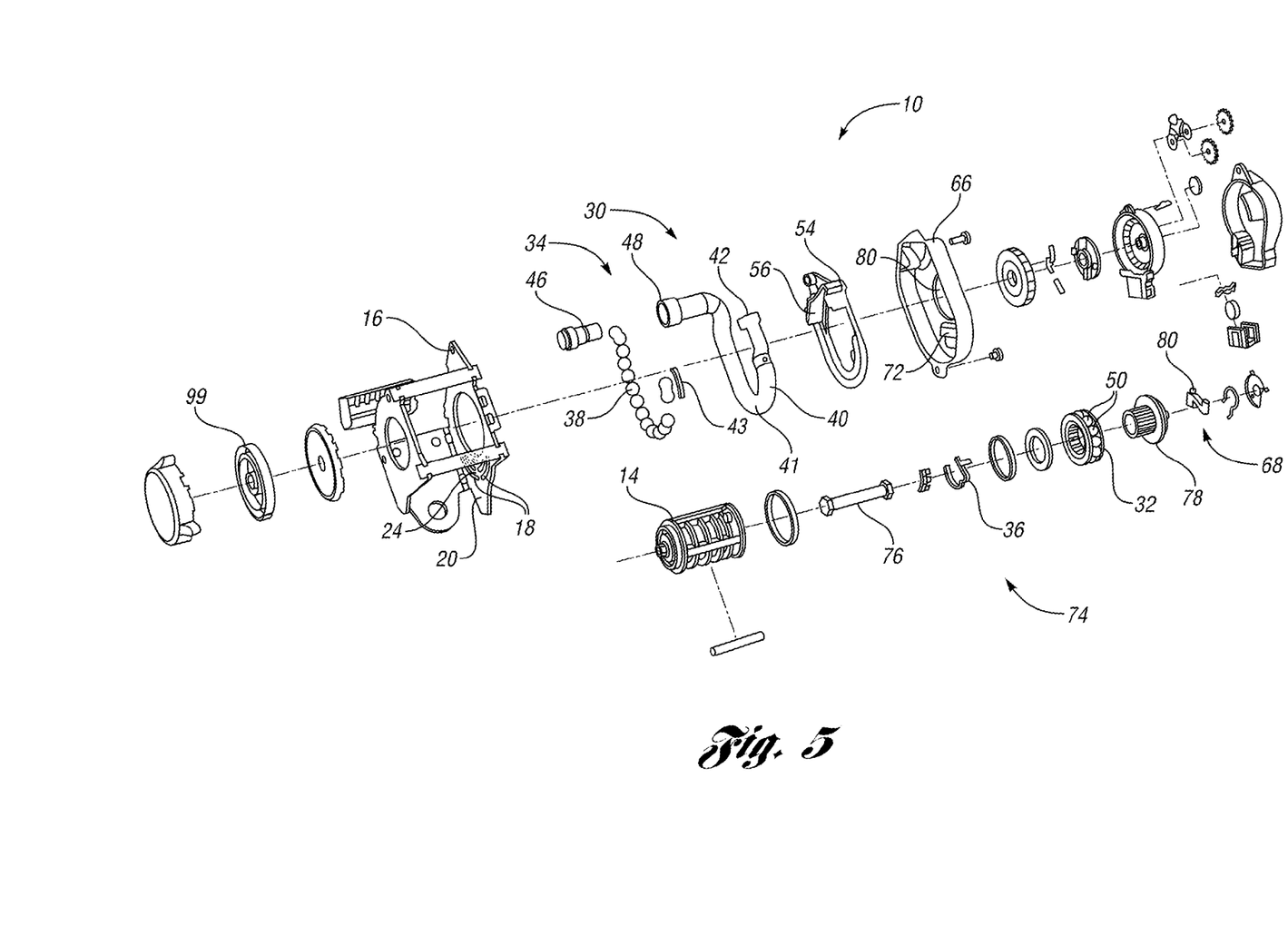
FIG. 5 is an exploded view of a device for pretensioning a seatbelt in accordance with one embodiment of the present invention.

As illustrated in FIGS. 1, 2 and 5, a pretensioner 30 is operatively connected to the spindle 14 for rotating the spindle 14 to tighten the seatbelt 12. In one embodiment, the pretensioner 30 is activated by an electronic control unit (not shown) via a pretension signal. In particular, a drive mechanism 34 is actuated to effectuate rotation of the spindle 14 via a load limiting element 36. One end of the load limiting element 36 is connected to the spindle via a coupling or direct attachment. A second end of the load limiting element 36 is connected to an end cap which is rotatable relative to the spindle 14, and the friction therebetween is controlled by design. A pinion 32, preferably disposed adjacent to the retractor frame 16, is connected between the end cap and the drive mechanism 34. A clutch, for example, may be used to selectively engage the pinion 32 with the spindle 14 via the end cap upon activation of the drive mechanism 34. It will be recognized by those skilled in the art that other suitable configurations for operatively connecting the pretensioner 30 to the spindle 14 may be used. Several exemplary pretensioners are disclosed in U.S. Patent Publication No. 2006/0243843, filed Apr. 27, 2005, and are hereby incorporated by reference in their entirety.

Figure 3:
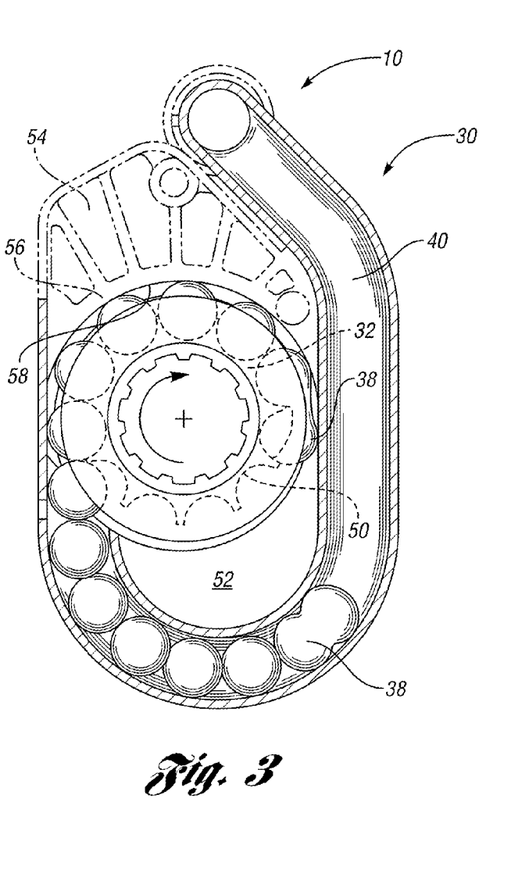
FIG. 3 is a side view of a portion of a device for pretensioning a seatbelt in accordance with an embodiment of the present invention.
Figure 4:
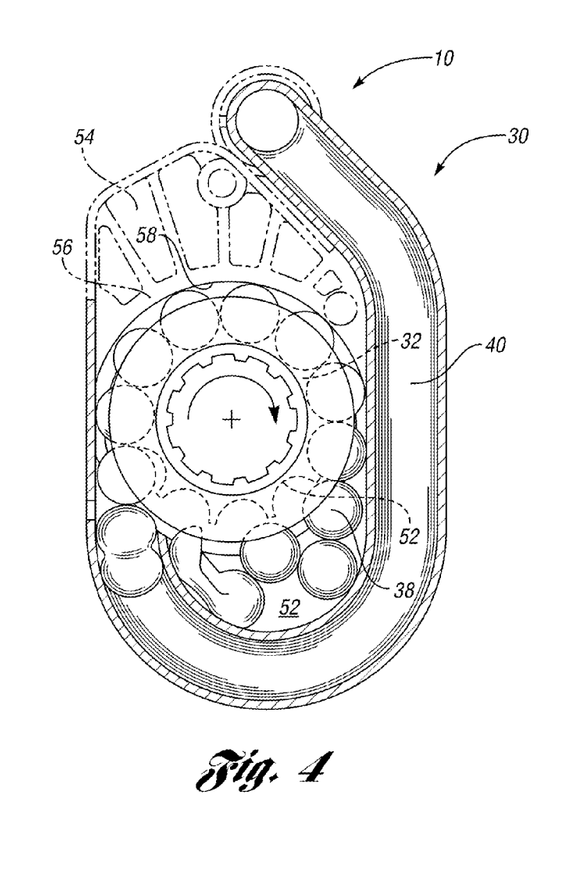
FIG. 4 is a side view of a portion of a device for pretensioning a seatbelt in accordance with another embodiment of the present invention.

As best seen in FIGS. 3-5, the drive mechanism 34 of the pretensioner 30 may include pretensioner balls 38 and a tube 40, which is disposed about the pinion 32. The tube 40 has an opened end 42 and may be in the form of a roto tube which includes at least one looped configuration 41. The pretensioner balls 38 are contained in the tube 40. The tube 40 has an inner diameter 44 sized so as to provide the pretensioner balls 38 with a path for being advanced therethrough. A breakaway tab 43 may be operatively coupled with the lead pretensioner ball 38 to facilitate the pretensioner balls 38 being retained within the tube 40.

The drive mechanism 34 further includes a gas generator 46 (e.g. pyrotechnic charge) in fluid communication with the tube 40. In one example, the gas generator 46 is positioned at an end 48 of the tube 40 disposed opposite the opened end 42. The gas generator 46 is configured to generate gas to advance the pretensioner balls 38 through the opened end 42. If the breakaway tab 43 is used, it is thereby released or "broken" during the gas generation phase, thereby releasing the pretensioner balls 38 from the tube 40.

In one embodiment, the pretensioner balls 38 are spheres (e.g. individual spheres or two or more merged spheres) made of a metal, e.g., aluminum, or polymer material, e.g., polyester and/or rubber. For example, the majority of the pretensioner balls 38 may be made of aluminum while the trailing ball or piston, i.e., the pretensioner ball 38 positioned closest to the gas generator 26, is made from a polymer. Other suitable materials may also be used. The pretensioner balls 38 preferably operatively seal the tube 40 such that pressure from the gas is maintained within the tube 40 while at least one pretensioner ball 38 is still disposed within the tube 40. As discussed in further detail below, retaining a high seal pressure within the tube 40 preferably stabilizes transition from a load limiting function to a pretensioning function.

The open end 42 of the tube 40 is in communication with the pinion 32. For example, the tube 40 is preferably positioned with the open end 42 immediately adjacent to the pinion 32 such that recessed features 50 of the pinion disposed thereabout readily receive the advancing pretensioner balls 38. The pinion 32 receives the moving pretensioner balls 38 which have kinetic energy to actuate the pinion 32 to rotate, thereby rotating the spindle 14 via the load limiting element 36.

The still moving pretensioner balls 38 are further driven from the pinion 32 toward a ball collection area 52. The ball collection area 52 is adjacent to the weakened portion 18 and is for receiving and storing the pretensioner balls 38 during and subsequent to pretensioning or tightening of the seatbelt 12. In one example, at least a portion of the ball collection area 52 is disposed between the pinion 32 and the tube 40.

In that the pretensioner balls 38 are moving and have corresponding kinetic energy, pressure is consequently applied to the weakened portion 18 from the pretensioner balls 38 as they crowd into the ball collection area 52. The pressure causes the weakened portion 18 to deform, preferably plastically, thereby increasing the size of the ball collection area 52 (See FIG. 2). The increased size of the ball collection area 52 allows for more pretensioner balls 38 to be stored therein. Moreover, deforming the weakened portion 18 absorbs energy from the pretensioner balls 38, reducing or arresting movement of the pretensioner balls 38 and the corresponding kinetic energy of the balls 38.

Referring to FIGS. 1-7, the pretensioner 30 may further include a guide plate 54. The guide plate 54 is preferably disposed adjacent to the retractor frame 16, either immediately adjacent thereto or for example, with the pinion 32 and/or the tube 40 disposed therebetween. The guide plate 54 is for guiding the pretensioner balls 38 from the drive mechanism 34 to the ball collection area 52 during pretensioning. Moreover, the guide plate 54 may provide bearing surfaces for the spindle 14 to rotate and can also provide locating surfaces for several components of the pretensioner 30, such as for example, the tube 40 and the pinion 32. The guide plate 54 may be made from a metal or plastic/polymer material or materials. Moreover, the guide plate 54 may for example, be die cast, forged (e.g. forged steel) or molded. In one example, the guide plate 54 is molded from a polymer that has be reinforced with at least one of fiberglass, whiskers, carbon fibers, ceramic fibers, ceramic fillers, polymer fibers and polymer fillers. Other suitable reinforcing additives for polymers known to those skilled in the art may also be used.

The guide plate 54 may have a deflector 56 form thereon for routing the pretensioner balls 38 toward the ball collection area 52. In one example, the deflector 56 is in the form of an arcuate groove 58. The guide plate 54 and the deflector 56 are positioned such that the groove 58 is disposed about the pinion 32 so that the pretensioner balls 38 are guided through the groove 58 during rotation of the pinion 32, thereby retaining the balls 38 within the recessed features 50.

In one embodiment, the guide plate 54 has a stopping element 60 formed thereon for obstructing movement of the pretensioner balls 38 within the ball collection area 52. The stopping element 60 is preferably positioned within or immediately adjacent to the ball collection area 52. The stopping element 60 may have, for example, an extruded triangular form with concave edges 62 for receiving the pretensioner balls 38.

In another embodiment, the guide plate 54 has a guide 64 formed thereon. The guide 64 is for directing movement of the pretensioner balls within the ball collection area 52 and accordingly, the guide 64 is preferably positioned within or immediately adjacent to the ball collection area 52.

In at least one embodiment, the pretensioner 30 further includes a cover 66. The cover 66 may be disposed adjacent to the guide plate 54, either immediately thereto or for example, with the tube 40 and/or pinion 32 disposed therebetween. The cover 66 is for containing and locating many of the components of the pretensioner 30, such as for example, the guide plate 54, the tube 40 and the pinion 32. Moreover, the cover 66 may retain a retractor locking assembly 68 discuss in further detail below. In one example, the cover 66 is constructed of deep drawn or stamped steel. Other suitable constructions for the cover 66 may also be used.

The weakened portion 18 of the retractor frame 16 preferably deforms in a direction opposite the cover 66 (See FIG. 2). For example, the weakened portion 18 may deform into an interior 70 of the retractor frame 16. In this embodiment, kinetic energy of the moving pretensioner balls 38 is absorbed by the weakened portion 18 and displacement of the deforming weakened portion 18 is such that the cover 66 does not become disengaged from the device 10 or more specifically, from its attachment to, for example, the retractor frame 16. Preferably, the radial position of the weakened portion 18 is spaced apart from the axis of rotation of the spindle 14 to prevent contact between the deformed weakened portion and the seatbelt webbing 12 wound about the spindle 14, although some engagement or friction may be permitted or even desired, depending on the application.

The cover 66 may also have a ball catch 72 for receiving the moving pretensioner balls 38. The ball catch 72 may form a portion of the ball collection area 52 and accordingly, is located adjacent to the weakened portion 18. The ball catch 72 may function similarly to the stopping element 60 of the guide plate 54 and may be used in lieu of the stopping element 60 or vice versa.

In an alternative embodiment, the cover 66 contains a weakened portion (not illustrated) which is deformable to increase the size of the ball collection area. In this embodiment, the retractor frame 16 may or may not have the weakened portion 18.

The device 10 further comprises a retractor 74 formed with the pretensioner 30. As is known in the art, during normal use the retractor 74 is used to wind up the seat belt 12 about the spindle 14. The spindle 14 is coupled to a torsion member 76 which preferably limits force to the seatbelt 12. The torsion member 76 is disposed within the spindle 14 and may be in the form of a torsion rod or torque bar. It will be recognized that the torsion member 76 may be other types of force limiting elements other than torsion rods which may be employed in conjunction with the present invention, including sleeves, rings or tubes. The torsion member 76 generally includes a first end 82 and a second end 84. The first end 82 is fixedly secured to the spindle 14, such as for example via a coupling, while the second end 84 is fixedly secured to a tread head 78, such as for example via another coupling. Preferably, the couplings are each constructed as a low-profile spline as disclosed in U.S. Pat. No. 7,273,191 filed Dec. 9, 2004, the disclosure of which is incorporated herein by reference in its entirety.

A spring 99 may be provided on one side of the retractor frame 16, such as for example, the side opposite the pretensioner 30. The spring 99 is operable to wind the seatbelt 12 on the spindle 14, as is known in the art.

The retractor 74 further includes a locking element 80, which is part of the retractor locking assembly 68. The locking element 80 is engaged with the tread head 78 to selectively lock the tread head 78 and second end 84 of torsion member 76 during an impact event such as a vehicle collision, providing an "emergency locking retractor" function as is well known in the art. In one example, the retractor locking assembly 68 and tread head 78 configuration may be of the type disclosed in U.S. Pat. Nos. 6,616,081; 6,592,064; 6,105,894; 6,012,667; 5,924,641; and 5,526,996, the disclosures of which are hereby incorporated by reference in their entirety. Through blocking of the tread head 78, the spindle 14 is prevented from rotating to protract the seatbelt 12, thereby restraining the occupant. However, the retractor 74 and the torsion member 76 also provide a low load limitation function in order to limit the restraint force imposed on the occupant. Upon reaching a predetermined restraint force, the spindle 14 will begin to rotate and "pay out" the seat belt 22 by actuation of the torsion member 76. That is, upon reaching a predetermined force, the torsion member 76, e.g. having a form of a rod, will twist to allow some rotation of the spindle 14 relative to the tread head 78 (and hence relative to second end 84) which is fixed by the retractor locking assembly 68. In this manner, a first load limitation characteristic is provided by the torsion member 76 to allow limited pay out or protraction of the seatbelt 12 wound on the spindle 14.

Figure 6:
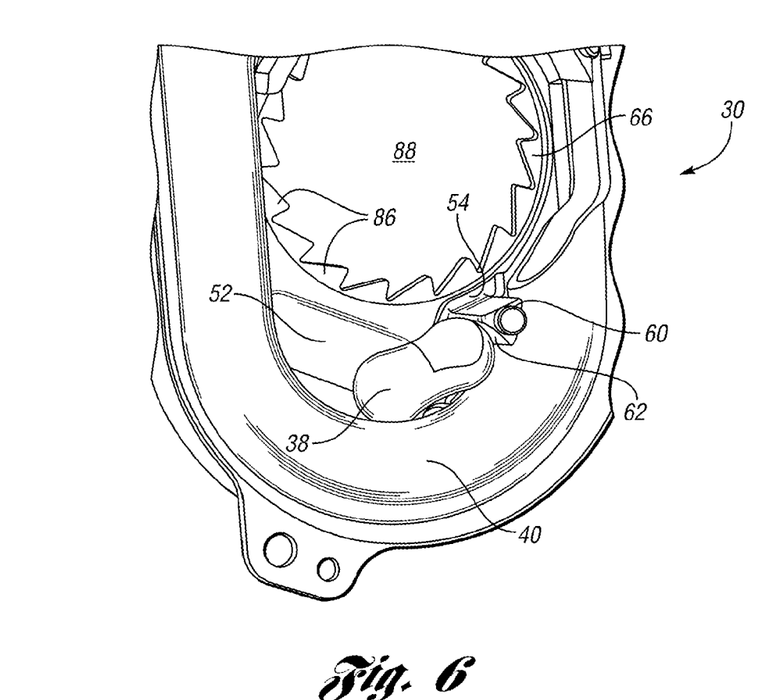
FIG. 6 is a partial perspective view of a device for pretensioning a seatbelt in accordance with an embodiment of the present invention.
Figure 7:
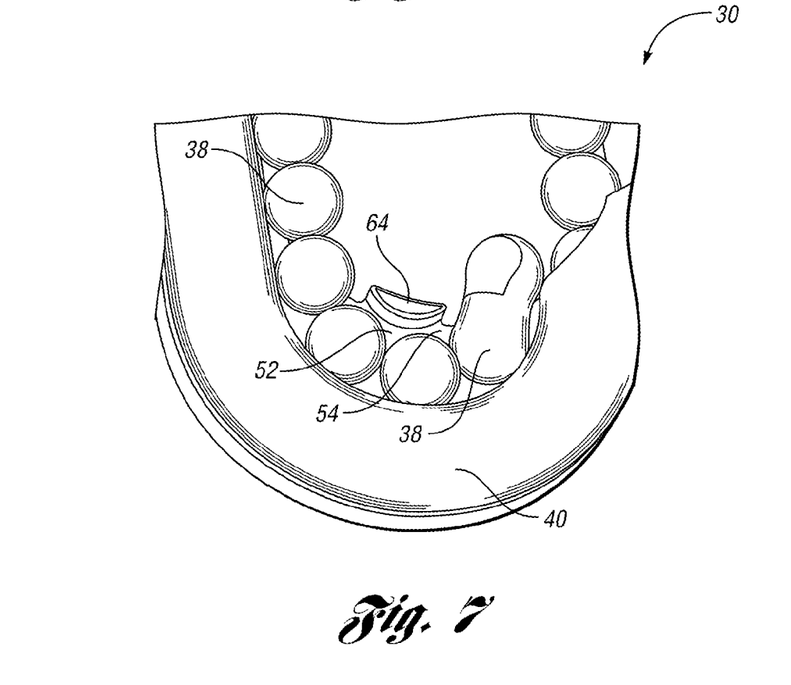
FIG. 7 is a partial perspective view of a device for pretensioning a seatbelt in accordance with another embodiment of the present invention.
Figures 8, 9A, 9B:
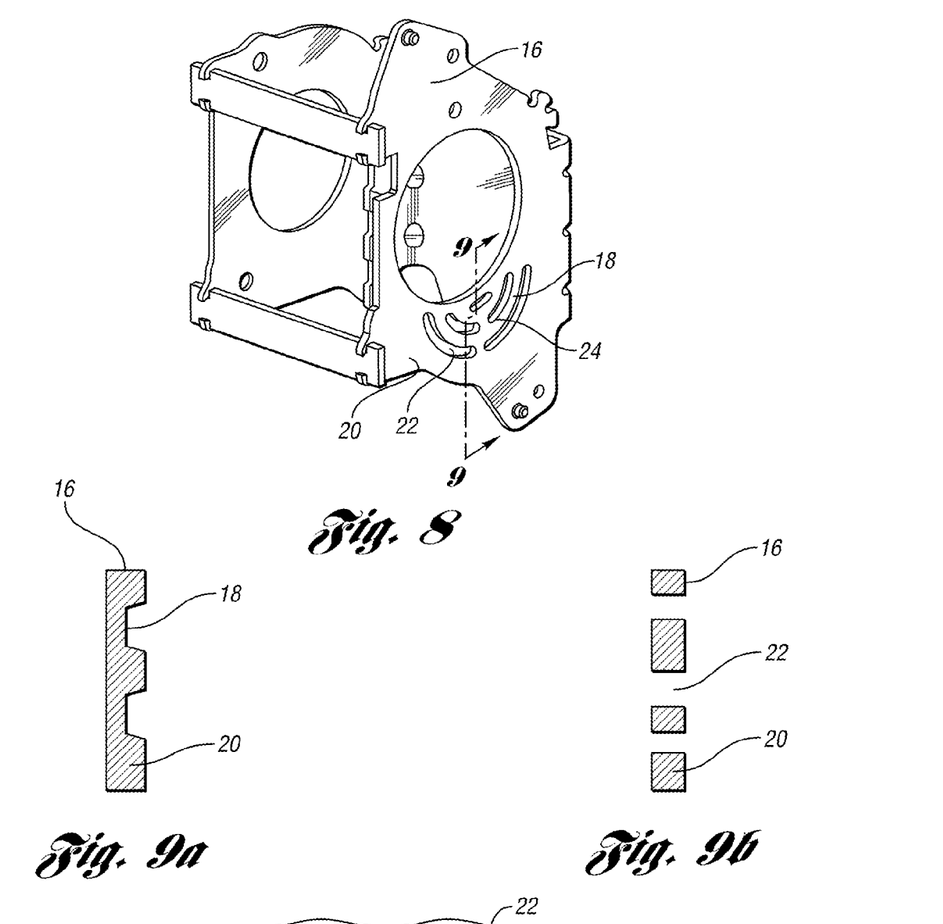
FIG. 8 is a perspective view of a retractor frame in accordance with an embodiment of the present invention.
FIG. 9a is a cross-sectional view of one example of a portion of the retractor frame depicted in FIG. 8.
FIG. 9b is a cross-sectional view of another example of a portion of the retractor frame depicted in FIG. 8.
Figure 9C:
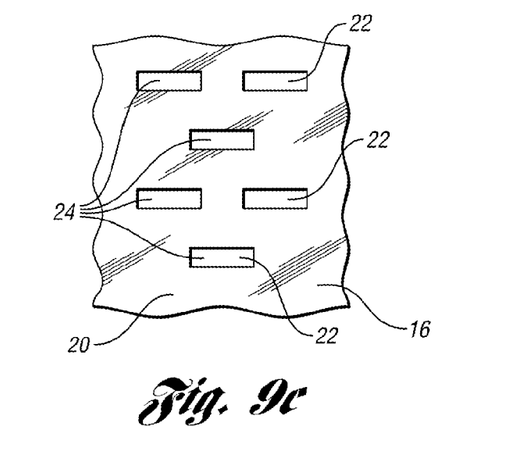
FIG. 9c is a partial side view of a portion of a retractor frame in accordance with an embodiment of the present invention.

In one other example, the cover 66 of the pretensioner 30 has an opening 88 formed therethrough. The tread head 78 is position with a portion disposed through the opening 88. The locking element 80 is pivotally attached to the portion of the tread head 78 disposed through the opening 88. As shown in FIG. 6, the opening 88 has a perimeter with the retractor lock teeth 86 formed thereon. The locking element 80 pivots to engage the retractor lock teeth 86 to selectively lock the tread head 78 to prevent protraction of the seatbelt 12. Notably in this example, the retractor locking assembly 68 and the pretensioner 30 are disposed adjacent to each other and are arranged on one of the same sides of the retractor frame 16. This configuration may preferably provide a more compact seatbelt pretensioner assembly.

As a person skilled in the art will readily appreciate, the above description is meant as an illustration of the implementation of the principles of this invention. This description is not intended to limit the scope or application of this invention in that the invention is susceptible to modification, variation, and change, without departing from the spirit of this invention as defined in the following claims.

The invention claimed is:

1. A device for pretensioning a seatbelt, the device comprising:
    a spindle for receiving a portion of the seatbelt;
    a retractor frame having a weakened portion and supporting the spindle for rotatable movement within the retractor frame; and
    a pretensioner operatively connected to the spindle for rotating the spindle to tighten the seatbelt, the pretensioner including pretensioner balls and configured to drive the pretensioner balls toward a ball collection area adjacent to the weakened portion, the weakened portion facing the ball collection area, the weakened portion being plastically deformed by the pretensioner balls to increase size of the ball collection area.

2. The device according to claim 1 wherein the pretensioner includes a guide plate disposed adjacent to the retractor frame, the guide plate having a deflector formed thereon routing the pretensioner balls toward the ball collection area.

3. The device according to claim 2 wherein the guide plate has a stopping element formed thereon for obstructing movement of the pretensioner balls within the ball collection area.

4. The device according to claim 2 wherein the guide plate has a guide formed thereon for directing movement of the pretensioner balls within the ball collection area.

5. The device according to claim 2 wherein the pretensioner includes a cover disposed adjacent to the guide plate, and wherein the increase size of the ball collection area extends in a direction opposite the cover.

6. The device according to claim 5 wherein the cover has a ball catch for receiving the pretensioner balls, the ball catch forming a portion of the ball collection area.

7. The device according to claim 5 further comprising a torsion member, a tread head and a locking element, the torsion member disposed within the spindle having a first end fixedly secured to the spindle and a second end fixedly secured to the tread head, the locking element engaged with the tread head to selectively lock the tread head, preventing protraction of the seatbelt and limiting belt force through the torsion member.

8. The device according to claim 7 wherein the cover has retractor lock teeth formed thereon, the locking element engaging the retractor lock teeth to selectively lock the tread head.

9. The device according to claim 5 wherein the pretensioner includes:
    a pinion disposed between the retractor frame and the cover, and engaged with the spindle for rotating the spindle to tighten the seatbelt;
    a tube disposed about the pinion and having an open end in communication with the pinion, the tube containing the pretensioner balls; and
    a gas generator in fluid communication with the tube and configured to generate gas to advance the pretensioner balls through the open end, actuating the pinion to rotate the spindle and driving the pretensioner balls toward the ball collection area.

10. The device according to claim 9 wherein at least a portion of the ball collection area is disposed between the pinion and the tube.

11. The device according to claim 1 wherein the retractor frame has a wall and the weakened portion is formed by localized thinning of the wall.

12. The device according to claim 1 wherein the retractor frame has a wall and the weakened portion is formed by the wall having at least one aperture formed therethrough.

13. The device according to claim 12 wherein the at least one aperture is a plurality of arcuate slots.

14. The device according to claim 1 wherein the weakened portion is a deformable member attached to the retractor frame.

15. The device according to claim 1 wherein the pretensioner balls have kinetic energy when driven toward the ball collection area, the pretensioner balls contacting the weakened portion, deforming the weakened portion and reducing the kinetic energy of the pretensioner balls.

16. The device according to claim 1 wherein the ball collection area receives and stores the pretensioner balls during and subsequent to pretensioning the seatbelt.

17. A device for pretensioning a seatbelt, the device comprising:
    a spindle for receiving a portion of the seatbelt;
    a retractor frame supporting the spindle for rotatable movement within the retractor frame and having a weakened portion formed thereon; and
    a pretensioner including:
        pretensioner balls;
        a pinion disposed adjacent to the retractor frame and selectively engaged with the spindle for rotating the spindle to tighten the seatbelt;
        a tube disposed about the pinion and having an open end in communication with the pinion, the tube containing the pretensioner balls; and
        a gas generator in fluid communication with the tube and configured to generate gas to pressurize the tube so as to advance the pretensioner balls through the open end, actuating the pinion to rotate the spindle and driving the pretensioner balls toward a ball collection area adjacent to the weakened portion, the pretensioner balls contacting the weakened portion, plastically deforming the weakened portion to increase size of the ball collection area and to reduce kinetic energy of the pretensioner balls.

18. The device according to claim 17 further comprising a tread head disposed adjacent to the pinion, a torsion member and a locking element, the torsion member disposed within the spindle having a first end fixedly secured to the spindle and a second end fixedly secured to the tread head, the locking element engaged with the tread head to selectively lock the tread head, preventing protraction of the seatbelt and limiting belt force through the torsion member.

19. The device according to claim 17 wherein at least a portion of the ball collection area is disposed between the pinion and the tube.

20. The device according to claim 17 wherein the weakened portion deforms toward an interior of the retractor frame to form the increase size of the ball collection area.

21. The device according to claim 17 wherein the retractor frame has a wall and the weakened portion is formed by one of localized thinning of the wall and the wall having at least one aperture formed therethrough.

22. A device for pretensioning a seatbelt, the device comprising:
- a spindle for receiving a portion of the seatbelt;
- a retractor frame supporting the spindle for rotatable movement within the retractor frame; and
- a pretensioner operatively connected to the spindle for rotating the spindle to tighten the seatbelt, the pretensioner including pretensioner balls and a cover disposed adjacent to the retractor frame, the retractor frame having a weakened portion, the pretensioner configured to drive the pretensioner balls toward a ball collection area adjacent to the weakened portion, the weakened portion forming a side of the ball collection area, the weakened portion being plastically deformed by the pretensioner balls to increase size of the ball collection area.

* * * * *